United States Patent [19]

Volungis

[11] Patent Number: 5,207,971
[45] Date of Patent: May 4, 1993

[54] EXTRUSION OF WRINKLE-FREE BLOWN FILM FROM HIGH MODULUS RESIN

[75] Inventor: Richard J. Volungis, Mason, Ohio

[73] Assignee: Quantum Chemical Corporation, New York, N.Y.

[21] Appl. No.: 832,254

[22] Filed: Feb. 7, 1992

[51] Int. Cl.⁵ .............................................. B29C 47/88
[52] U.S. Cl. .................................. 264/564; 264/566; 264/569; 425/326.1
[58] Field of Search .......................... 264/564–569, 264/40.3; 425/72.1, 326.1, 140

[56] References Cited

U.S. PATENT DOCUMENTS

| | | | |
|---|---|---|---|
| 3,167,814 | 2/1965 | Corbett | 425/326.1 |
| 3,548,042 | 12/1970 | Hinrichs | 264/565 |
| 4,000,234 | 12/1976 | Pilgrim et al. | 264/569 |
| 4,330,501 | 5/1982 | Jones et al. | |
| 4,399,094 | 8/1983 | Fujitani et al. | |
| 4,447,387 | 5/1984 | Blakeslee, III et al. | |
| 4,624,823 | 11/1986 | Audureau et al. | 425/326.1 |
| 4,750,874 | 6/1988 | Keim | 425/326.1 |
| 4,818,467 | 4/1989 | Audureau et al. | 425/326.1 |
| 4,834,924 | 5/1989 | D'Annunzio et al. | 425/326.1 |
| 4,842,803 | 6/1989 | Bose et al. | 264/566 |

FOREIGN PATENT DOCUMENTS

| | | | |
|---|---|---|---|
| 61-235129 | 10/1986 | Japan | 425/72.1 |
| 62-21521 | 1/1987 | Japan | 264/564 |

OTHER PUBLICATIONS

"Modern Plastics" Nov. 1991, Alpine ad.

*Primary Examiner*—Jeffery Thurlow
*Attorney, Agent, or Firm*—Kenneth D. Tremain; William A. Heidrich

[57] ABSTRACT

An improved blown-film extrusion process with particular application for high modulus thermoplastic resins. A cylinder is mounted above the cooling air ring. The film bubble passes through this cylinder, which has a diameter approximating the final diameter of the bubble. The frost line remains at or slightly higher than the top of the cylinder, leaving a small gap between the top of the cylinder bubble. The improvement enhances bubble cooling and stability and results in wrinkle-free film.

13 Claims, 1 Drawing Sheet

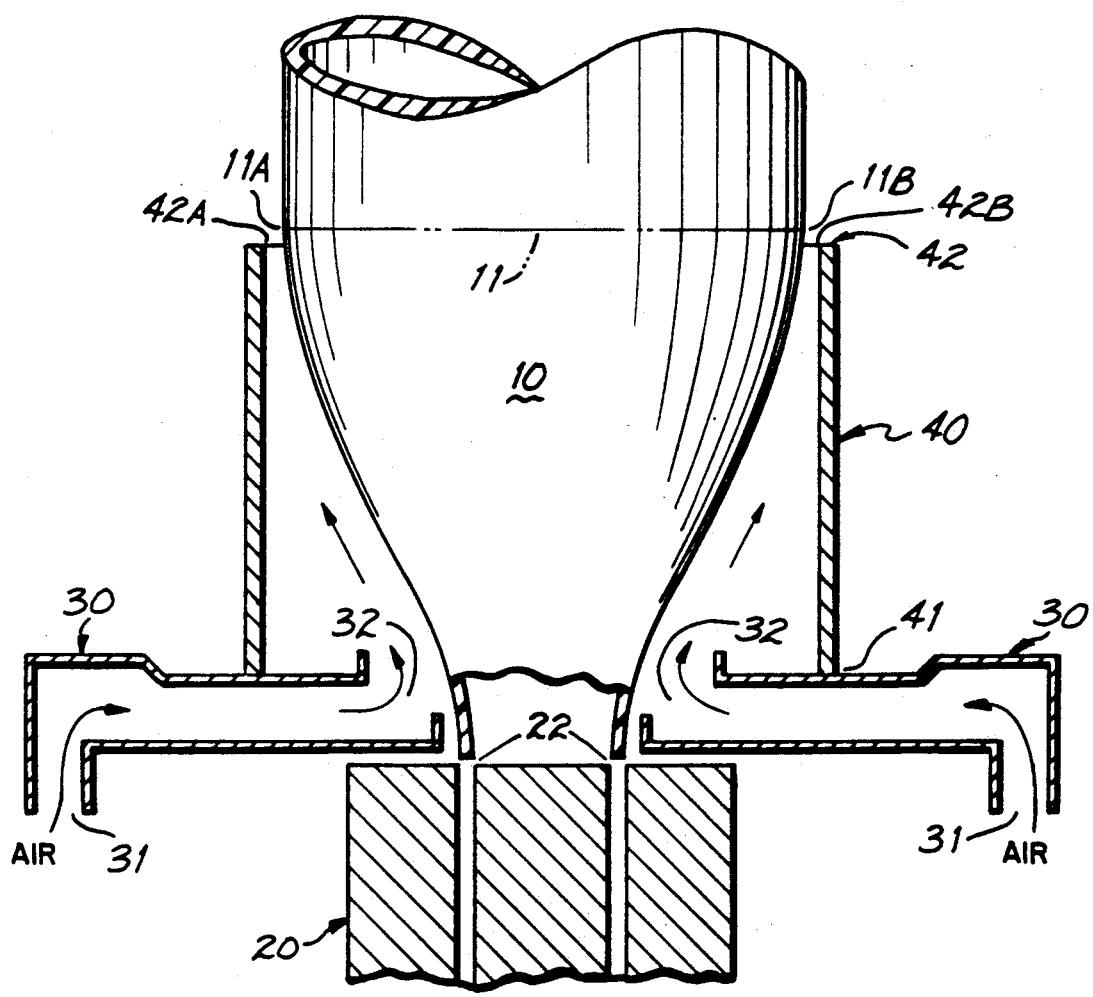

EXTRUSION OF WRINKLE-FREE BLOWN FILM FROM HIGH MODULUS RESIN

BACKGROUND OF THE INVENTION

1. Field of the Invention

This invention relates to a process for blown film extrusion. More particularly, the invention relates to an improvement whereby high modulus thermoplastic films can be extruded without wrinkles by a process including the use of a cylinder mounted above the air ring.

2. Description of Related Art

Extrusion of film through a circular die has been practiced for over three decades, and need not be described in detail here. The most commonly blown resins include low density polyethylene (LDPE), blends of linear low density polyethylene (LLDPE) with LDPE, high density polyethylene (HDPE), poly(vinyl chloride) (PVC), and nylon. Because these resins differ in rheology, heat transfer and other physical properties, they behave differently when blown into film. Processing equipment designed or optimized for one resin, such as for LDPE, will often be unsuitable for processing other resins.

In blown film extrusion, the resin forms a tube of molten polymer as it travels upward from a circular die. Air inside this tube forces it to expand radially outward as it cools, forming a film "bubble." The bubble is then flattened by nip rollers or other devices which serve to trap a fixed amount of air within the bubble.

The position at which the molten polymer solidifies is called the frost line. Above the frost line, there is usually no further expansion and the bubble has achieved its final diameter.

Cooling devices called air rings are typically included above the die to cool the molten film more rapidly. There are many variations in air ring designs. Many have two or more air openings such as the so-called "dual lip" air rings, although rings with a single air orifice are also suitable. An alternative is tandem air rings, such as shown in U.S. Pat. No. 4,330,501 to Jones et al., wherein forced air is provided at two levels.

With large volumes of air being introduced at high velocities, processing problems can arise. The film bubble can be unstable, drifting or "snaking" from side to side, producing gauge variations in the film. This is often a concern when blowing "long stalk" films; i.e., those in which the bubble expands after the film travels a relatively great distance above the die.

Resins which are blown "in the pocket," i.e., those in which the bubble expands radially only a short distance above the die, can suffer from air impinging the film at a high velocity. In severe cases the air can deform the bubble at a critical phase of cooling and wrinkles will be produced in the film. This is a particular problem when blowing films from high modulus resins, either in a monolayer film or in a multilayer film with one or more other resins.

Similar difficulties encountered with other resins have spurred experimentation with new devices for providing or channeling the cooling air. U.S. Pat. No. 4,447,387 to Blakeslee, III, et al. suggests the use of a passive flow air ring or "air collar" located above the primary air ring. Forced air is provided to the lower air ring, while a second source of cooling air is induced to flow through the induced flow air collar. Also mounted on the upper surface of the induced flow air collar is a gas flow rectifier or diffuser as shown by numbers 44 and 46 of the figure in that patent.

Another variation is described in U.S. Pat. No. 4,399,094 to Fujutani et al. wherein a tube of linear low density polyethylene passes through a first enclosed space, then passes an air ring where it is contacted with cold air for rapid cooling, then through a second enclosed space where it is allowed to expand and solidify. According to Example 1, the position of the frost line is immediately above the air ring.

In spite of these proposed equipment modifications, there remained a need for a system capable of processing high modulus resins without producing bubble deformation and wrinkles in the film. It is therefore an object of this invention to provide a process capable of overcoming these difficulties without extensive equipment alteration.

SUMMARY OF THE INVENTION

The invention is an improved process for blowing wrinkle-free film from thermoplastic resins which have a relatively high modulus, that is, greater than 140,000 psi. The resin is extruded through a circular die to form a film tube which then passes through an air ring above the die. A cylinder is mounted on the top surface of the air ring so that its lower edge forms an air seal against the air ring at a position outside the air orifice. The cylinder has continuous walls and is open at the top.

In the process of the invention, the film tube is expanded radially to form a bubble having a frost line no lower than the top edge of the cylinder. The maximum bubble diameter is from 90 to 105 percent of the diameter of the cylinder's top edge. A stream of air is forced through the air ring and cylinder sufficient to maintain the gap between the bubble and the cylinder's upper edge at less than ten percent of the maximum bubble diameter.

BRIEF DESCRIPTION OF THE DRAWING

The sole FIGURE is a schematic drawing of a blown film extrusion process showing the position of the extrusion die, air ring, cylinder, and the path of the film tube.

DESCRIPTION OF THE PREFERRED EMBODIMENT

The thermoplastic resins suitable for use in the process of this invention are those with a high modulus, that is, above 140,000 psi as measured by ASTM D 638. If modulus is measured in both the machine direction and transverse direction, a resin should be considered a high modulus resin if either value is above 140,000. The process is particularly useful for resins above 200,000 psi, or even at 400,000 psi or above, since these resins are particularly difficult to extrude in a blown film process with conventional equipment.

The Apparatus

Suitable resins and their representative modulus values include high density homopolymers and copolymers of ethylene as represented by PETROTHENE® HD 6180 (from Quantum Chemical Corporation, USI Division) having a nominal modulus of 160,000 psi, random copolymers and impact grade copolymers of propylene with a modulus of about 150,000; propylene homopolymers of about 200,000, ethylene vinyl alcohol (EVOH) at about 380,000, poly(ethylene terephthalate) (PET) at 400,000, and poly(butylene terephthalate)

(PBT) at 400,000. These resins are contrasted with low modulus resins that are often blown into films, including low density polyethylene (LDPE) with modulus values typically from 20,000 to 30,000, and linear low density polyethylene with modulus values near 30,000.

Referring to the schematic FIGURE, an extrusion die 20 having a circular opening 22 is provided through which the molten thermoplastic resin flows in an upwardly direction to form a film tube 10. Cooling air is forced through air ring 30 entering one or more inlets 31 and exiting through orifice 32. A cylinder 40 is mounted on the upper surface of air ring 30 and is sealed thereto at its lower circumference 41. The film tube 10 is permitted to expand within this cylinder 40, although the frost line 11 remains at or higher than the upper circumference 42 of the cylinder. The gap between the upper circumference of the cylinder and the nearest surface of film bubble 10, shown in this FIGURE as between points 42A and 11A, is less than ten percent of the final bubble diameter which is, in this example, between points 11A and 11B.

The size of the film bubble that can be blown depends in part upon the diameter of the die. The size of the die is not critical to the invention; diameters of from 3 to 36 inches are generally used in the industry.

A very simple air ring 30 is shown. The type and specific design is not critical, but better results can be achieved with more modern designs which have internal baffles and dispersion plates and controls to improve the uniformity of the air flow. A dual lip air ring is preferred. Believed to be especially suitable are air rings available from Brampton Engineering of Brampton, Ontario, Canada, such as the Uniflow D H CHALLENGER air ring.

The cylinder 40 is preferably sized according to the desired size of the film bubble, rather than vice versa. In practice, the film bubble diameter is selected to produce a film of certain "lay flat" width, within limitations dictated by the die size, resin properties, and blow-up ratio. The cylinder, therefore, is constructed to have a diameter at its upper circumference 42 that is approximately the same as, or a few percent wider than, the target film bubble diameter. Although a straight cylinder is preferred for simplicity and ease of construction, the walls can also be angled in or out at slight angles, e.g. 1 to 10 degrees from the vertical, resulting in a conical or reverse conical shape.

Because the cylinder will not be subjected directly to intense heat, many materials such as metal, plastic, fiberboard, etc., could be used to construct it. Light gauge metal is preferred. Although it is placed on top of the air ring, the cylinder does not need to be permanently attached thereto, but merely placed to form an air seal at its lower circumference 41 and optionally braced to prevent lateral movement. A rubber gasket or other sealing material can be used at circumference 41.

The height of cylinder 40 can vary based upon the processing characteristics of the resin. If the cylinder is too high, the bubble may attempt to expand to its final diameter within the cylinder, creating the possibility that the air flow will disturb the natural bubble shape. If the cylinder is too short, the effect of the invention will be minimized and the bubble may become unstable. Recommended cylinder height is from 0.25 to 1 times its diameter, with a height about 0.5 times the diameter preferred. In an alternate embodiment (not illustrated), sleeves or additional cylinders can be placed immediately inside or outside of the cylinder 40 to allow the effective height to be readily changed.

The Process

During the process the molten film tube 10 passes from the die 20, past the air ring 30, and through the cylinder 40. The air within the tube causes it to expand, and air volume should be adjusted so that the frost line 11 stays at the same level as, or only slightly higher than, the top of the cylinder 42. The maximum bubble diameter (11A to 11B) should range from 90 to 105% of the diameter of the cylinder's upper circumference (42A to 42B).

Regulation of the air flow exiting from the air ring orifice 32 is important. The objective is to adequately cool the film by the time it exits the cylinder. If the air flow is too low, the frost line 11 will tend to rise and the bubble will not cool adequately and may become unstable. If the air flow is too high, the frost line will lower and the bubble will fully form within the cylinder, constricting the air flow and encouraging bubble deformation. It may be necessary to adjust both the air flow outside the bubble as well as the volume of air within the bubble to obtain the desired bubble shape and frost line position.

The invention may be further illustrated by reference to the following example.

EXAMPLE

A high modulus EVOH resin (EVAL ® F-101 ethylene vinyl alcohol resin from Eval Company of America, Lisle, Ill., having a modulus of 384,000 psi) was blown as the center layer in a multilayer A/B/C/B/A construction wherein layer A was a blend of LLDPE and LDPE and layer B was PLEXAR ® modified polyolefin adhesive. The desired lay flat film width was 100 inches, so that the target bubble had a circumference of about 200 inches and a diameter of 66 inches. The extrusion equipment included a 24" diameter die and a dual lip high output air ring. Before using the process of this invention, the film formed its frost line at about one foot above the die and had visible wrinkles which would appear and disappear in seemingly random patterns.

For use in the inventive process, a cylinder was formed from 16 gauge galvanized steel sheet. The cylinder diameter was approximately 64 inches and the height was half the diameter. During operation the frost line formed at the top of the cylinder, and the gap between the bubble and the cylinder's upper edge was about one inch. No wrinkles were observed in the film.

Although the invention has been illustrated by description of a few embodiments, those skilled in the art will recognize that variations can be made without departing from the scope of the invention, which is limited only by the following claims:

I claim:

1. A process for blown-film extrusion of high modulus resin, the process comprising
    extruding through a circular die a thermoplastic resin, having a modulus of greater than 140,000 psi as measured by ASTM D638, to form a film tube;
    passing the film tube through an air ring which has an air orifice;
    passing the film tube through a cylinder above the air ring, the cylinder having continuous walls, being sealed at its lower circumference to the air ring at a position outside the air ring orifice, and being open at its upper circumference;

expanding the film tube radially to form a bubble having a frost line no lower than the upper circumference of the cylinder and having a maximum bubble diameter of from 90 to 105 percent of the cylinder diameter at the cylinder's upper circumference; and maintaining a flow of air through the air ring and cylinder sufficient to maintain the gap between the bubble and the cylinder's upper circumference at less than ten percent of the maximum bubble diameter.

2. The process of claim 1 in which the cylinder has a height of from 0.25 to 1 times the cylinder diameter.

3. The process of claim 2 in which the height is about 0.5 times the cylinder diameter.

4. The process of claim 1 in which the maximum bubble diameter is from 95 to 100 percent of the diameter at the cylinder's upper circumference.

5. The process of claim 1 in which the gap between the cylinder and bubble is less than five percent of the maximum bubble diameter.

6. The process of claim 1 in which the resin has a modulus of greater than 200,000 psi.

7. The process of claim 1 in which the resin is selected from the group consisting of high density homopolymers and copolymers of ethylene, homopolymers and copolymers of propylene, ethylene vinyl alcohol, nylon, poly(ethylene terephthalate), and poly(butylene terephthalate).

8. The process of claim 7 in which the resin is selected from high density homopolymers and copolymers of ethylene.

9. The process of claim 7 in which the resin is selected from homopolymers and copolymers of propylene.

10. The process of claim 7 in which the resin is ethylene vinyl alcohol.

11. The process of claim 7 in which the resin is nylon.

12. The process of claim 7 in which the resin is poly(ethylene terephthalate).

13. The process of claim 7 in which the resin is poly(butylene terephthalate).

* * * * *